United States Patent [19]

Burkett

[11] 4,212,682

[45] Jul. 15, 1980

[54] PROCESS AND APPARATUS FOR PRODUCING AN AGGREGATE MATERIAL FROM BOTTOM ASH

[75] Inventor: William E. Burkett, Saltville, Va.

[73] Assignee: James River Hydrate & Supply Co., Inc., Buchanan, Va.

[21] Appl. No.: 886,116

[22] Filed: Mar. 13, 1978

[51] Int. Cl.$^2$ .............................................. C04B 31/10
[52] U.S. Cl. .................................... 106/288 B; 106/97
[58] Field of Search .................... 106/97, 98, 288 B; 209/13, 18; 210/66, 59

[56] References Cited

U.S. PATENT DOCUMENTS

| | | | |
|---|---|---|---|
| 3,961,973 | 6/1976 | Jones | 106/98 |
| 3,962,080 | 6/1976 | Dulin et al. | 106/DIG. 1 |
| 4,040,852 | 8/1977 | Jones | 106/98 |

*Primary Examiner*—James E. Poer
*Attorney, Agent, or Firm*—Bacon & Thomas

[57] ABSTRACT

A process and apparatus are disclosed for producing a cinder material useful as an aggregate in building materials such as building blocks or paving materials. The aggregate is produced from solid particles of waste, particularly bottom ash formed from the burning of coal in a power plant. Water is mixed as a vehicle with the bottom ash at the power plant to form a slurry, and the slurry is transported to a processing plant through a fluid conduit. At the processing plant the slurry is partly dewatered and excessive proportions of fine particles removed by passing the slurry through a baffled flume. Overside particles are removed from the slurry by passing it over a screen. The slurry is then fed into a screw classifier which separates out a solid particle component to provide a high quality cinder aggregate.

9 Claims, 5 Drawing Figures

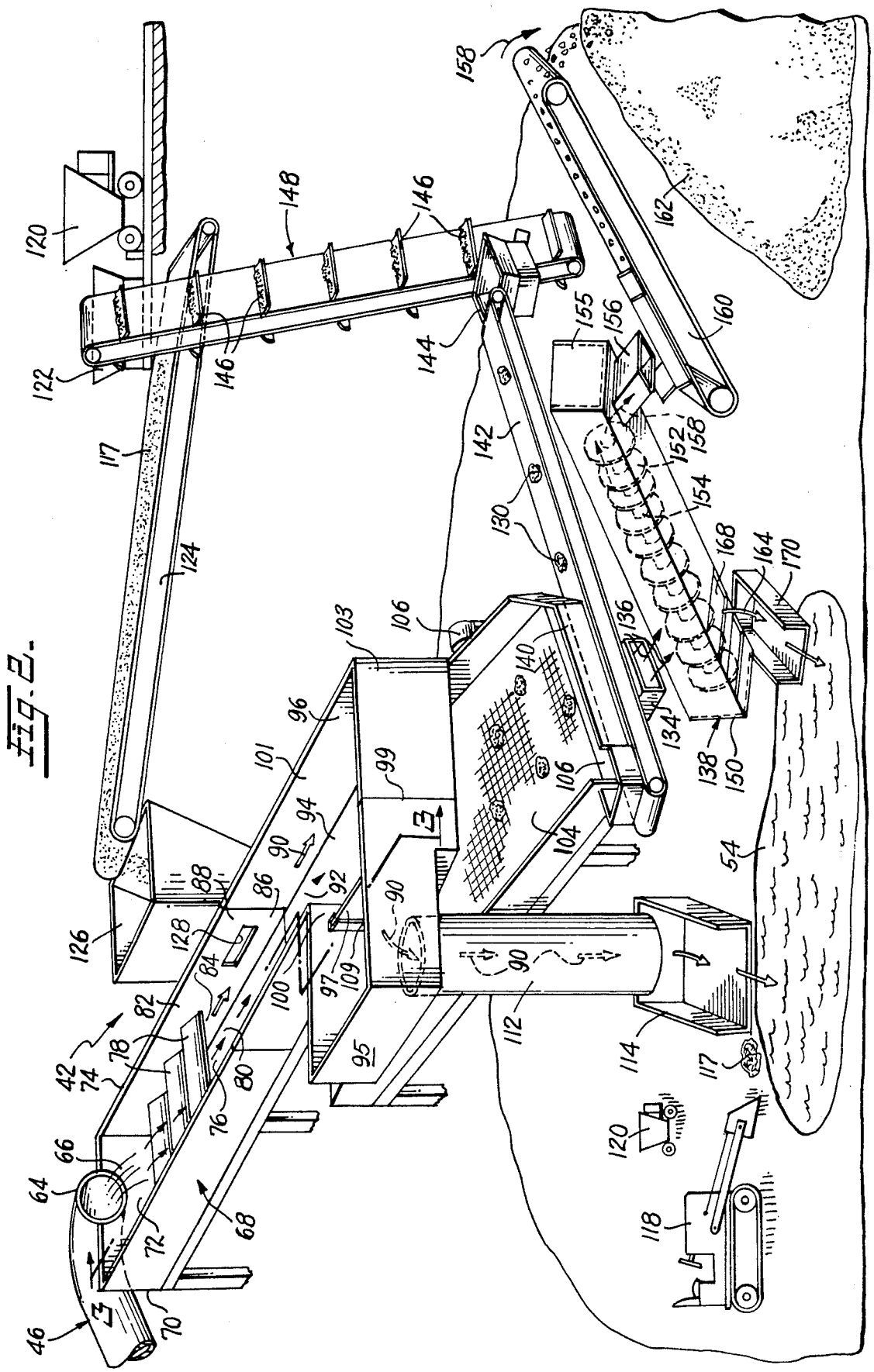

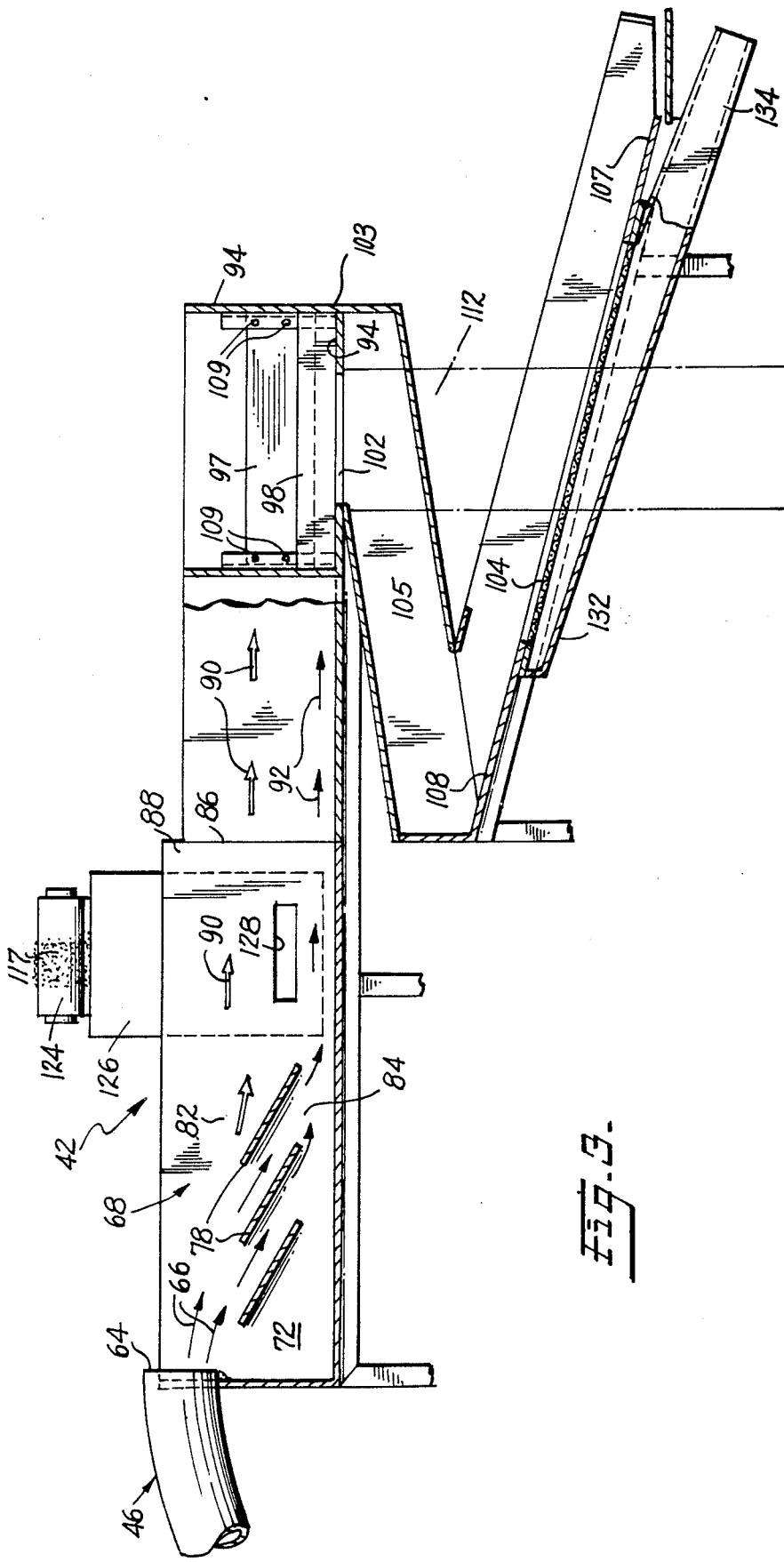

PROCESS AND APPARATUS FOR PRODUCING AN AGGREGATE MATERIAL FROM BOTTOM ASH

BACKGROUND

1. Field of the Invention

The present invention relates to conversion of a waste product into a useful building product, specifically, the conversion of bottom ash from a coal burning power plant into a high quality aggregate.

2. Description of the Prior Art

Steam generating power plants utilizing coal as fuel must dispose of waste cinders produced by burning of the coal. In a typical power plant, a substantial portion of the ash produced falls through a grate in the steam boiler, and this ash or cinder is known as "bottom ash". Normally, power plants use water as a vehicle to move the cinders or bottom ash from the plant to settling ponds for subsequent rehandling. A common method of rehandling of the settled-out cinders involves the use of excavation equipment to load the material into trucks and haul it to a disposal area which may be located a considerable distance away. Due to the lightness of the cinder and the fineness of a portion of the particles making up the ash, special handling is required to prevent dust problems. Often, the ash must be disposed of by using it in a land-fill operation whereby the cinders and fine particles are incorporated into other materials such as clay, shale, etc. to prevent dusting and related problems. Such ash disposal is very expensive, amounting to millions of dollars per year in this country.

Cinders, such as found in bottom ash from coal burning power plants, have been used for many years in the production of masonry units and lightweight concrete, and various methods for providing optimal sized cinders, such as crushing and screening, have been used. Normally, the screening takes place in the dry state. Dry screening ordinarily requires a discontinuous process, i.e., dry bottom ash usually cannot be conveniently conveyed to a processing plant on a continuous basis, such as through a pipeline. Also, dry screening has been found to be disadvantageous in grading the smaller particles found in bottom ash. In particular, some of the particles comprising bottom ash are very fine, i.e., particles which will pass 100 or 200 mesh. It has been found that a certain proportion of these fine particles are desirable as an aggregate component, as the fine particles help fill interstices between the coarser particles in the building material matrix. Ordinary bottom ash as produced in a power plant, however, includes a much greater proportion of fine particles than is desirable. Such proportion of fine particles is generally on the order of 20%. When such proportion of fine particles is used in a building material, a large amount of cement is needed to coat and bond the fine particles. The fine particle component also contributes to problems in forming of building blocks, contributes to problems in achieving uniformity in color and texture in finished building blocks, results in a long curing time, and results in a relatively heavy block. Another disadvantage of excessive fines is a problem known as "flash set" in which the fines draw water from cement causing overly rapid setting of the cement and resulting in cracking and weakening of the concrete. Although this can be overcome by adding more water and cement and by increasing the mixing time, this results in increased costs and is disadvantageous.

Screening is a generally unsatisfactory method of efficiently grading large quantities of these very fine particles from the bottom ash. Thus, no effort is normally made to remove the fine particles from the bottom ash before using it as an aggregate. The aforementioned dry screening process is ordinarily used only for separating oversized particles from the bottom ash.

It is known to dispose of the waste products of coal burning power plants by forming an aqueous slurry of the waste products, particularly fly ash, and then treating the slurry in such a way that a useful end product will be formed such as mineral wool, or aggregate material. Such processes are disclosed in U.S. Pat. No. 3,962,080 to Dulin et al and U.S. Pat. No. 3,642,445 to Muter et al. Such processes, however, also directly or indirectly involve the treatment of stack gases and, as such, either involve specialized equipment in the power plant or are applicable to only certain types of power plants. Also, these processes involve treatment of the waste product by subjecting it to very high temperatures, again involving special equipment and considerable expense.

3. Objects of the Invention

It is therefore an object of the present invention to provide a process and apparatus for producing a cinder aggregate from waste products of power plants which process and apparatus are readily compatible with virtually all types of coal burning power plants which produce bottom ash without substantial modification to the power plant.

It is a related object of the invention to provide a process and apparatus for disposing of bottom ash from a power plant and at the same time continuously producing cinder aggregate from the bottom ash at a processing plant without requiring special processing of the bottom ash at the power plant.

It is a related object of the invention to provide a process and apparatus for producing a cinder aggregate from bottom ash in which the bottom ash is continually removed from the power plant in an aqueous slurry and in which the operation of the power plant is not otherwise affected by the ash removal and aggregate production.

It is yet another object of the invention to provide a wet classifying system for treating bottom ash.

It is a further object of the invention to provide a process and apparatus for producing a uniform and lightweight aggregate from cinder containing ash.

It is a further object of the invention to provide a process and apparatus for producing an aggregate material for use in building materials, such as masonry units or pavement, wherein the aggregate material is of very high quality.

It is another object of the invention to provide a building block having an improved material composition.

It is a more specific object of the invention to provide a process and apparatus for producing an aggregate material from cinder containing ash, the use of which aggregate in a masonry unit: (a) permits a lower than usual cement content per masonry unit produced without loss of strength; (b) effects reduction of waste or cull units; (c) results in uniformity of color and texture in the finished units; (d) effects lower unit weight of the finished masonry unit thereby resulting in transportation and labor savings; and (e) results in less curing time for the "green" masonry units.

It is another object of the invention to provide a process and apparatus for disposing of power plant bottom ash and converting it into a high quality aggregate in which waste water from the conversion process is recycled back to the power plant for reuse in conveying bottom ash to the processing plant, in which a bypass arrangement is provided at the processing plant to accommodate shut downs of the processing plant without affecting continuous disposal of bottom ash from the power plant, and in which screened-out oversized cinders in the processing plant are crushed and reprocessed.

Still other objects and advantages of the present invention will be apparent from the following description and from the drawing.

SUMMARY

To achieve the foregoing objects, bottom ash formed by burning coal in a power plant is mixed with water to form an aqueous slurry. The slurry flows into a conduit communicating with the power plant and is transported through the conduit to a processing plant where certain proportions desirable of particle types are selectively removed from the slurry to form the cinder aggregate. Means in the processing plant for selectively removing or separating certain proportions of particle types from the slurry include a flume, the flume having a plurality of baffles for directing particles in the slurry downwardly toward the bottom of the flume to form a concentrated slurry component in the bottom region of the flume and a dilute, upper, first waste slurry component in the upper region of the flume; outlet means coupled with the flume for directing the dilute, first waste component out of the flume toward a waste reservoir and out of the flow path of the slurry; an inclined screen downstream of the flume and in communication therewith, the screen having a pair of opposed sides, one of which is disposed lower than the other, the screen having openings of such size as to screen out the largest particles from the slurry while allowing the remaining slurry to pass therethrough; and means, downstream of the screen and communicating therewith, for cleaning the larger slurry particles and for classifying the slurry into a second waste component comprising water and any remaining excessive proportions of fine particles and aggregate component comprising particles in the desired particle size proporportions. The action of the selective removing means is such that between 1–6% of the particles of the solid particle component will pass 200 mesh, and preferably 2–5% of such particles will pass 200 mesh.

Oversized particles removed from the inclined screen are conveyed to a crushing device and thereafter reintroduced into the lower region of the flume for reprocessing. The aqueous waste component which has flowed into the reservoir is returned to the power plant for recycling after having passed through filtering media such as gravel beds. The second waste component from the cleaning and classifying means, which component comprises water and fine particles, is discharged into this waste reservoir, also for recycling as described, and the solid particle or aggregate component is stockpiled for later use as an aggregate material. Preferably, the cleaning and classifying means takes the form of a conventional inclined screw classifier.

The processing plant includes a means for bypassing part of the removing or separating means when not in operation. In this regard, solid particles of the concentrated slurry component cease to flow through the inclined screen, whereby the flume will receive excess slurry beyond that which can be accommodated by the lower region of the flume. The bypass means includes means for effecting flow of excess slurry from the flume into the outlet means and thence into the waste reservoir. The desirably sized cinder particles which flow into the reservoir when the processing plant is in the bypass condition can be later recovered by an excavating machine and reintroduced into the processing plant for processing into aggregate material.

The aggregate material so produced is particularly advantageous in constructing building blocks. The blocks produced are lighter in weight than conventional blocks without sacrifice in strength, require less cement than a conventional block made from unprocessed bottom ash, are of more uniform color and density, and cure faster than conventional blocks. Such building blocks, in the cured, dried condition comprise between 8% and 12% cement, between 30% and 60% of a cinder aggregate which has been produced in accordance with the present invention, and between 45% and 65% of a conventional stone based aggregate material such as sand, river gravel, crushed limestone, or crushed basalt. The cinder aggregate material of the present invention may also be advantageously used as a component of paving material.

Although the present invention is especially applicable to bottom ash produced by coal burning power plants it has applicability to other coal burning facilities and to cinders formed other than by burning coal. For instance the present invention would also be applicable to volcanic ash.

BRIEF DESCRIPTION OF THE DRAWING

FIG. 2 is a diagrammatic view of the apparatus of the invention for producing a cinder aggregate.

FIG. 3 is a cross-sectional view taken on the line 3—3 of FIG. 2.

DETAILED DESCRIPTION OF THE PREFERRED EMBODIMENT

Figure 1:
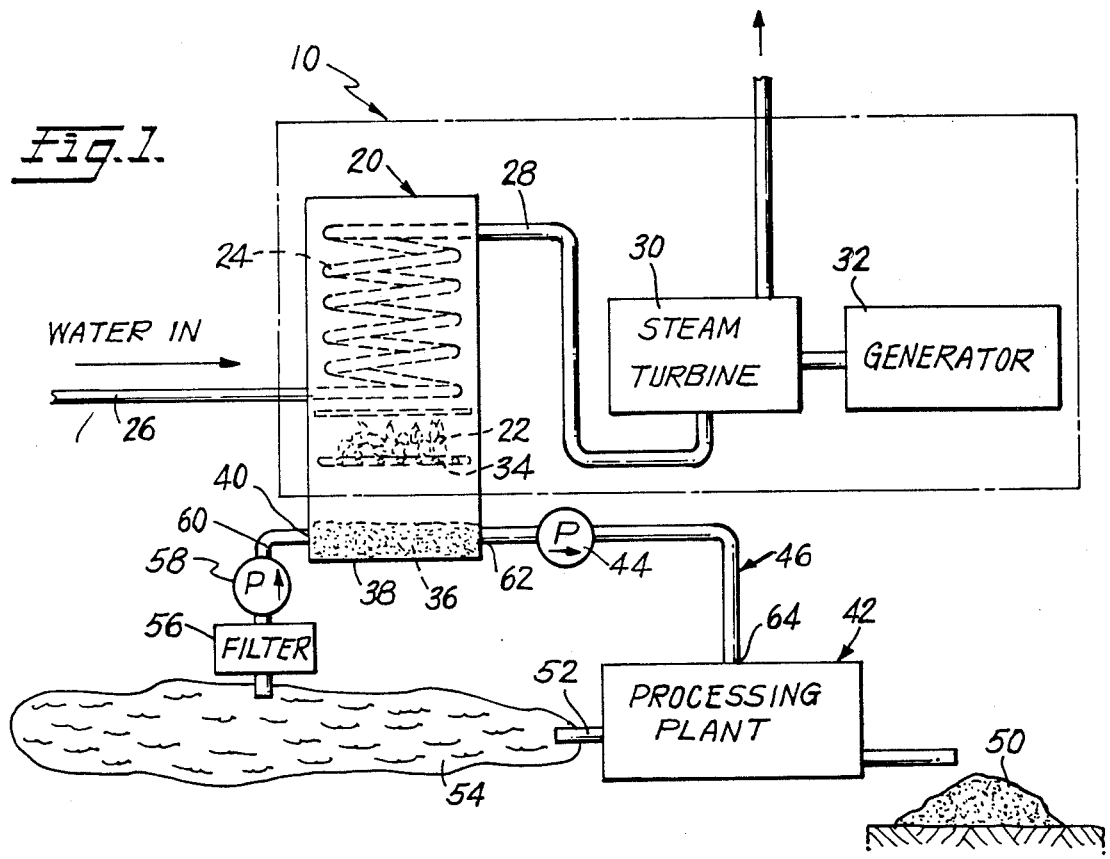
FIG. 1 is a diagrammatic view of a coal burning power plant showing the manner in which the cinder processing apparatus of the present invention is connected therewith.

Referring to FIG. 1, reference character 10 generally refers to a coal fired steam generating power plant having a boiler 20. Coal 22 is burned in the boiler 20, and the heat produced thereby is transferred to coils 24. In a well-known manner, water is fed into the boiler at 26, and steam is formed in the coils and conveyed through a conduit 28 to a steam turbine 30. The steam turbine 30, in turn, drives a generator 32 to produce electrical energy.

As is typically the case, coal 22 is burned above a grate 34 so that ash and cinders 36 commonly referred to as "bottom ash" formed by the burning of coal 22 drop through the grate to be collected therebelow in a collector 38. Water is fed into collector 38 at inlet 40 and is mixed with the bottom ash to form an aqueous slurry of the bottom ash. The dropping of bottom ash 36 through the grate 34 and the introduction of water into the collector 38 takes place continually.

The slurry of bottom ash and water is pumped from the collector 38 to a processing plant, generally referred to by reference character 42, via a pump 44 and conduit 46. As will be described in more detail hereinafter, solid particles having the desirable sizes for use in an aggregate material are separated out from the slurry and stockpiled at 50 for a later use. Waste materials, which take the form of water and undesirable proportions of fine particles of bottom ash, are fed at 52 into a reservoir 54. Preferably, reservoir 54 takes the form of a settling pond. The waste material in pond 54 is passed through one or more filter or separating media as represented schematically at 56. The filter or separating media 56 may take the form of several settling ponds, gravel beds through which water may percolate, and the like. After filtering, a substantial amount of the fine particles will have been removed from the water, and the water will be in a condition to be reintroduced into the collector 38 of the power plant via pump 58 and conduit 60. This recycled water again forms a slurry with the bottom ash 36, and the process described above is repeated.

FIG. 2 shows the construction of processing plant 42. The first end 62 of conduit 46 is in communication with the power plant 10 (FIG. 1). Conduit 46 terminates in a second end 64 which is open and which communicates with the processing plant 42. An aqueous bottom ash slurry 66, formed in the power plant 10 as described, flows from the open end 64 of conduit 46 into a flume 68. Flume 68 has the form of an elongated metal container with rectangular sides. Preferably, the entire upper side of the flume is open, and, in any event, the flume will be opened at the end 70 which is nearest the discharge end 64 of conduit 46. The open area at end 70 of the flume provides an inlet 72 for the flow of slurry. Extending transversely across the flume at levels intermediate the top 74 and bottom 76 of the flume are a plurality of baffles 78. Baffles 78 are inclined downwardly with respect to the direction of slurry flow, i.e. the baffles are inclined downwardly in the direction from the inlet end 70 to the opposite, outlet end 80.

The positioning of the baffles 78 at intermediate levels as described provides an upper flow path space 82 above the baffles and a lower flow path space 84 below the baffles. When certain solid particles in slurry 66 impinge on the surfaces of baffles 78, these particles are directed toward the bottom 76 of the flume 68. Due to the relatively high weight and inertia of many of the particles, such particles tend to remain near the bottom of the flume as the slurry flows toward the outlet end 80. Because of this, the slurry becomes stratified forming a concentrated slurry component in a lower region 86 of the flume and a dilute, primarily aqueous slurry component in an upper region 88 of the flume. In this regard, it will be understood that The upper, primarily aqueous waste component will also contain in suspension undesirable proportions of very fine, powdery particles of the original bottom ash 36. In FIG. 2, the upper, waste slurry component is represented by light arrows 90 and the lower, concentrated slurry component is represented by dark arrows 92.

Flume 68 communicates with a trough 94 via outlet end 80 of the flume. Trough 94 includes a laterally extending leg portion 95 which is separated from a main body portion 96 of trough 94 by a vertically movable wall 97 mounted in a lower housing 98. Housing 98 serves two functions. First it holds the wall 97 and guides it in vertical sliding movement. Second, it provides a barrier at the bottom of trough 94 to prevent flow of concentrated slurry component from the main body portion 97 of trough 94 into lateral leg portion 95 thereof. Wall 97 serves as a barrier at which the flow paths of the two slurry components 90,92 diverge. The juncture 99, between the main portion 96 and leg portion 95, is open at 100 in the upper region 101 of the trough 94. Upper region 101 of the trough corresponds with upper region 88 of flume 68. Open area 100 permits the upper, primarily aqueous slurry component 90 to flow through juncture 99 into the laterally extending leg portion 95 of trough 94.

Trough 94 includes a concentrated slurry discharge opening 102 (FIG. 3) in the bottom of the trough 94 at that end 103 of the main portion 96 which is most remote from flume 68. The concentrated slurry component 92 remains in the main flow path of slurry through the processing unit by flowing through opening 102 and thence to a vibratory inclined screen 104 after being reversed in direction and thereby slowed in flow rate to facilitate screening by a reversed inclined chute 105 (See FIG. 3) which has a direction of incline opposite to that of screen 104. The slowing of the flow rate by way of reversed inclined chute 105 is important in preventing excessive particle disturbances, surges, and overflows in the later processing steps.

Screen 104 is in communication with flume 68 via trough 94 and is disposed below both the flume and trough at ends 80, 103 thereof. Inclined screen 104 includes a motor driven vibrating device 106 to impart vibratory movement to the screen and has a pair of opposed sides 107, 108, a lower side 107 of which is disposed below the upper side 108 to provide the incline.

While the concentrated slurry component 92 flows through chute 105 toward inclined screen 104, the upper, primarily aqueous slurry component 90 flows, as discussed, into laterally extending leg portion 95 of trough 94. This component separation is effected in part by vertically movable wall 97. The amount of upper slurry component 90 to be directed out of the main flow path into leg portion 95 is controlled by the height of wall 97. Generally, it has been found desirable to direct two-thirds of the flow from flume 68 into leg portion 95, with the other one-third remaining in the main flow path and flowing toward inclined screen 104 for further processing. This splitting of flows can be controlled and tuned by adjusting the height of wall 97; the higher the wall, of course, the less flow into leg portion 95. Wall 97 is held at the optimum height by fasteners 109.

By far the major portion of the fine particle removal takes place at this stage. That is, most of the fine particle reduction is effected by the fine particles floating off with the water of the upper slurry component 90, which component is bled off by passing over wall 97 into leg portion 95 and out of the main flow path. A large diameter, vertically disposed outlet pipe 112 communicates with the laterally extending leg 95. The primarily aqueous component 90 which has flowed into leg portion 95 passes down through outlet pipe 112 and into a slightly inclined open conduit 114 at the lower end of the outlet pipe to flow into the waste reservoir 54.

As discussed previously, the formation of the slurry 66 at the power is generally continuous. In this regard, the production of bottom ash and the consequent need to dispose thereof is related to electrical power demands. It will be apparent that the time at which the bottom ash slurry 66 is pumped from the power plant 10 may not always coincide with a desirable time for operating the processing plant 42. Also, it is desirable to provide for conditions wherein the bottom ash disposal at the power plant may continue even when the processing plant 42 must be shut down. Accordingly, means are provided for bypassing part of the processing plant 42 at times when the bottom ash slurry 66 is being fed to the processing plant from the power plant but when the entire processing plant is not in operation.

Bypassing of that portion of the processing plant which requires the attention of an operator is effected by de-energizing the motor driven vibrating device 106 of inclined screen 104. This will cause solid particles which would normally pass through the screen to build up on the screen 104 and back up into chute 105. The backup of particles into chute 105 prevents the concentrated slurry component 92 from flowing through bottom opening 102 toward inclined screen 104. When particles have backed up through chute 105 to block opening 102 during shutdown of the processing plant 42, the flow of slurry 66 into flume 68 will still take place, and the baffles 78 will still effect stratification of the slurry into a lower concentrated component 92 and an upper, less concentrated component 90. Thus, the concentrated component 92 will be ready for further processing when operation of the entire processing plant 42 is resumed. Of course, when the concentrated slurry component 92 has built up to an extent that it can no longer be accommodated by the lower region 86 of flume 68, the excess, including the larger bottom ash particles which otherwise would have been directed into the lower region 86, will flow over the wall 97 and into the trough 94 in the same manner that the upper, primarily aqueous slurry component 90 flows into trough 94 during operation of the plant. This excess or overflow will then be directed into the laterally extending leg portion 95, through outlet pipe 112, through open conduit 114, and into the waste reservoir 54 in the same manner as the slurry component 90 during operation of the plant.

As previously discussed, waste reservoir 54 does not indefinitely hold the fluid component which is fed into it; i.e., liquid in the reservoir 54 gradually flows out of the reservoir to be returned to the power plant 10. The material flowing into reservoir 54 is held long enough, however, for settling of the heavier bottom ash particles, particularly those which would have formed part of the concentrated slurry component 92 and would have received further processing if the plant 42 were in operation but which have been bypassed into the reservoir during shutdown of the processing plant. These larger particles which have settled out can be recovered by an excavating machine when the reservoir 54 is in a relatively dry condition. The settled out material 117 is loaded into a truck 120 by excavator 118 and thence transported to a hopper 122 by the truck 120. The settled out material 117 is fed into hopper 122 which in turn feeds the material to a conveyor 124. Conveyor 124 feeds the material into another hopper 126 mounted on flume 68. Material 117 then passes into the lower region 86 of flume 68 through an opening 128. It will be apparent that opening 128 effects communication between the hopper 126 and lower region 86 of the flume. Material 117 which is passed into the flume in this manner is then further processed in the same manner as concentrated slurry component 92.

The further processing of the concentrated component 92 will now be described. It will be apparent that the following description with respect to slurry component 92 also applies to the handling of material 117 introduced into the lower region 86 of the flume 68 in the manner just described. As discussed, the concentrated slurry component 92 is fed to inclined screen 104. Preferably, the screen 104 includes ⅜" square apertures for removing from the slurry component 92 oversized particles or cinders which are not a desirable component of the aggregate. The oversized particles 130 are retained on the upper side of screen 104 while the remaining slurry component 92 passes through the screen to be collected in a pan 132 below screen 104 and directed to a chute 134. The slurry component which has passed through the screen is referred to as the screened slurry component and is represented by dark arrows 136. As illustrated, screened slurry component 136 is fed by chute 134 into an inclined screw classifier generally designated by reference character 138.

The incline and vibratory movement of screen 104 effects movement of the screened-out overside particles 130 down the screen to the lower side 106 thereof. A chute 140 affixed to inclined screen 104 in the area of the lower side 106 thereof directs oversized particles 130 from the lower side 106 of the screen onto a conveyor 142. Conveyor 142 deposits oversized particles 130 in a crusher 144 which crushes the particles to a size generally within the desired range of sizes for the finished aggregate.

The crushed cinders 146 are fed by a conveyor 148 to hopper 122. These crushed cinders 146 are then reintroduced into the processing plant and in particular into the lower region 86 of the flume 68 in the same manner as described in connection with the settled-out material 117.

Screw classifier 138 is of a conventional type known in the art and is inclined upwardly in the direction of material flow. In this regard, reference is had to U.S. Pat. No. 2,428,777, which is hereby incorporated by reference, for a more detailed disclosure of the structure and operation of an inclined screw classifier.

As illustrated, screened slurry component 136 is fed into the lower end 150 of screw classifier 138. Slurry component 136 is subject to the action of an augerlike screw 152 mounted on a shaft 154 in the classifier 138. Screw 152 "rakes" the cinders of the desired size from slurry 136 and directs them to the upper end 155 of the classifier 138 where they pass into an outlet chute 156. The desirable cinders so separated are referred to as the solid particle component or aggregate component and they are designated by dark arrows and schematic representations 158. The solid particle component 158 passes from chute 156 onto a conveyor 160 which transports component 158 to a stockpile 162 from which the solid particle component may later be removed after drying for use as an aggregate in building materials.

What remains behind at the lower end 150 of the screw classifier as a result of the separation of the desired solid particle component 158 is a waste component including primarily water and some fine particles in suspension. This waste component is represented by light arrows 164. It is discharged through multiple openings 166, 168 in the general area of lower end 150 of the upwardly inclined screw classifier 138. Waste component 164 passes from openings 166, 168 into a chute 170 which directs waste component 164 into reservoir 54. As previously described, the waste liquid flowing into the reservoir is filtered and recycled for reuse in forming a slurry at the power plant 10 and transporting new bottom ash to the processing plant 42.

An important function of the screw classifier 138 is to scrub the solid particle component 138. Fine particles which cling to the larger particles are dislodged from the larger particles by the action of the screw classifier. Also the action of the screw 152 on the particles removes an undesirable coating on the cinder particles. Removal of this coating effects better adherence of cinders in a building material mixture. In this same regard, the action of the screw 152 cleans out the pores of the cinders resulting in added strength when the cinders are used in a building material, apparently due to filling of the pores by cement for increased adhesion.

EXAMPLE

As a particular example of the process and apparatus described above, bottom ash produced at the Carbo plant of the American Electric and Power Company, Cleveland, Virginia, was mixed into a slurry at the power plant at the rate of 180,000 gallons of water to 80 tons of cinder and was transported through a conduit directly to a processing plant. The flow of slurry into the flume varied between 2800 and 3200 gallons per minute. After dewatering in the flume and trough, the concentrated slurry component was passed over a 4×12 WS Tyler screen with ⅜" square openings which was set at an angle of 18% with respect to horizontal and which was converted to a wet screen. The screenedout component was directed to a single, 30" diameter screw classifier manufactured by Eagle Iron Works and the cinder aggregate separated by the screw classifier stockpiled. The processed cinder aggregate was mixed with a conventional crushed limestone aggregate, and with cement and water and formed into 8"×8"×16" building blocks. The cinder aggregate was also used in paving material.

In the description which follows characteristics of various samplings of the processed cinder aggregate produced in accordance with the present invention will be set forth, along with characteristics of the mixture used in the production of building blocks and the crushed limestone aggregate used therein.

Table 1 below shows the resutls of a sieve analysis of the stockpiled, processed cinder aggregate material produced in accordance with the present invention. The results shown were derived from 3 samples taken from different locations in the stockpile.

TABLE 1

| Sieves | % Passing |
|---|---|
| #4 | 77.9 |
| #8 | 50.3 |
| #16 | 21.8 |
| #30 | 9.6 |
| #50 | 5.1 |
| #100 | 2.8 |
| #200 | 1.6 |

Tables 2 and 3 show sieve analyses made at different times of a processed cinder aggregate produced in accordance with the present invention, but taken from a stockpile at a block plant, i.e., the cinder aggregate has been loaded onto vehicles from the stockpile at the processing plant, transported to the block and re-stockpiled.

TABLE 2

| Sieve Size | Cumulative % Retained | % Passing |
|---|---|---|
| 4 | 27.7 | 72.3 |
| 8 | 53.4 | 46.6 |
| 16 | 79.0 | 21.0 |
| 30 | 90.8 | 9.2 |
| 50 | 95.5 | 4.5 |
| 100 | 97.8 | 2.2 |
| 200 | 98.8 | 1.2 |

TABLE 3

| Sieve Size | Cumulative % Retained | % Passing |
|---|---|---|
|  | 19.3 | 80.7 |
| 8 | 48.1 | 51.9 |
| 16 | 78.4 | 21.6 |
| 30 | 90.6 | 9.4 |
| 50 | 94.9 | 5.1 |
| 100 | 97.1 | 2.9 |
| 200 | 98.3 | 1.7 |

As will be seen from Tables 1, 2, and 3, the percentages of material passing 100 mesh are 2.8%, 2.2%, and 2.9%, respectively. That is, in each instance the percentage of material passing 100 mesh is less than 3%.

The crushed limestone aggregate, which is mixed with the cinder aggregate of the present invention in the production of building blocks is of a conventional type which meets Virginia State Highway Commission Standard No. 13, and such crushed limestone is commonly referred to in Virginia as No. 13 limestone. The limestone is very similar to that which meets Standard No. 4 in New Mexico and referred to there as No. 4 limestone. Table Nos. 4, 5, and 6 show sieve analyses taken at different times of various samples of this No. 13 limestone taken before mixing the same with the cinder aggregate of the present invention in the production of building blocks.

TABLE 4

| Sieve Size | Cumulative % Retained | % Passing |
|---|---|---|
| 4 | 8.6 | 91.4 |
| 8 | 39.7 | 60.3 |
| 16 | 65.4 | 34.6 |
| 30 | 78.2 | 21.8 |
| 50 | 84.4 | 15.6 |
| 100 | 88.2 | 11.8 |
| 200 | 90.7 | 9.3 |

TABLE 5

| Sieve Size | Cumulative % Retained | % Passing |
|---|---|---|
| 4 | 4.2 | 95.8 |
| 8 | 27.2 | 72.8 |
| 16 | 52.0 | 48.0 |
| 30 | 70.4 | 29.6 |
| 50 | 82.8 | 17.2 |
| 100 | 90.1 | 9.9 |
| 200 | 94.1 | 5.9 |

TABLE 6

| Sieve Size | Cumulative % Retained | % Passing |
|---|---|---|
| 4 | 9.0 | 91.0 |
| 8 | 32.9 | 67.1 |

TABLE 6-continued

| Sieve Size | Cumulative % Retained | % Passing |
|---|---|---|
| 16 | 58.8 | 41.2 |
| 30 | 74.5 | 25.5 |
| 50 | 83.2 | 16.8 |
| 100 | 88.9 | 11.1 |
| 200 | 92.1 | 7.9 |

Table 7 shows the compositions of various batches of material incorporating the processed cinder aggregate, which batches have been used successfully in the production of improved cinder containing building blocks.

TABLE 7

| BATCH A | (30% Processed Cinders) |
| | 4000 lbs. No. 13 Crushed Limestone |
| | 1700 lbs. Cinder |
| | 550 lbs. Cement |
| BATCH B | (47% Processed Cinders) |
| | 3000 lbs. No. 13 Crushed Limestone |
| | 2700 lbs. Cinder |
| | 550 lbs. Cement |
| BATCH C | (50% Processed Cinders) |
| | 2800 lbs. No. 13 Crushed Limestone |
| | 2800 lbs. Cinder |
| | 550 lbs. Cement |

Other conventional concrete components may be added to the mixtures shown in Table 7.

Use of the processed cinder aggregate of the present invention in a mixture as disclosed results in considerably lighter building blocks. For example a conventional 8"×8"×16" building block made from crushed limestone and cement weighs approximately 34 pounds. Building blocks, made from a mixture comprising 2700 lbs of processed cinder aggregate according to the present invention, 3000 lbs. of No. 13 limestone and 500 lbs of cement, each weigh approximately 27.25 lbs.

As discussed earlier, the primary reduction of fine particles in the cinder treating process of the invention takes place in the flume 68 and trough 94, although the screw classifier 138 also fulfills a role in this regard. The fine particle reduction in the flume and trough is demonstrated by Table 8, which shows the results of a sieve analysis of material which has been collected as a result of bypassing the screen 104 and other elements downstream thereof. Essentially, then, Table 8 represents a sieve analysis of what has been referred to as the concentrated slurry component 92, but in a relatively dry condition. Table 8 represents an average of 3 samples.

TABLE 8

| AVERAGE OF 3 SAMPLES | |
|---|---|
| Sieves | % Passing |
| 1" | 93.8 |
| ½" | 93.8 |
| ¼" | 78.1 |
| 4 | 47.4 |
| 8 | 26.6 |
| 16 | 14.5 |
| 30 | 10.1 |
| 50 | 7.7 |
| 100 | 5.1 |
| 200 | 3.1 |

Table 9 represents the results of a sieve analysis similar to that of Table 8, except that the material of Table 9 was passed over the screen 104 but the remaining steps downstream of the screen were omitted. The oversized particles retained on screen 104 were passed back into the flowstream before the material was collected for sieve analysis. The material of Table 9 was collected at a different time from that of Table 8.

TABLE 9

| Sieve Size | Cumulative % Retained | % Passing |
|---|---|---|
| 1" | 5.3 | 94.7 |
| ½" | 5.3 | 94.7 |
| ¼" | 18.7 | 81.3 |
| #4 | 49.1 | 50.9 |
| #8 | 71.9 | 28.1 |
| #16 | 84.3 | 15.7 |
| #30 | 88.8 | 11.2 |
| #50 | 91.6 | 8.4 |
| #100 | 94.5 | 5.5 |
| #200 | 96.7 | 3.3 |

In producing building blocks from the aggregate produced in accordance with the foregoing disclosure, between 7% and 12% cementitous material is mixed with between 30% and 60% of the solid particle component or aggregate 158 from stockpile 162 and from between 45% and 65% No. 13 crushed limestone. Water is added, and the resulting mixture is formed into building blocks which are later dried by a steam drying process. Other stone-based aggregates may be used in place of the crushed limestone such as crushed basalt, sand, or river gravel.

Figure 5:
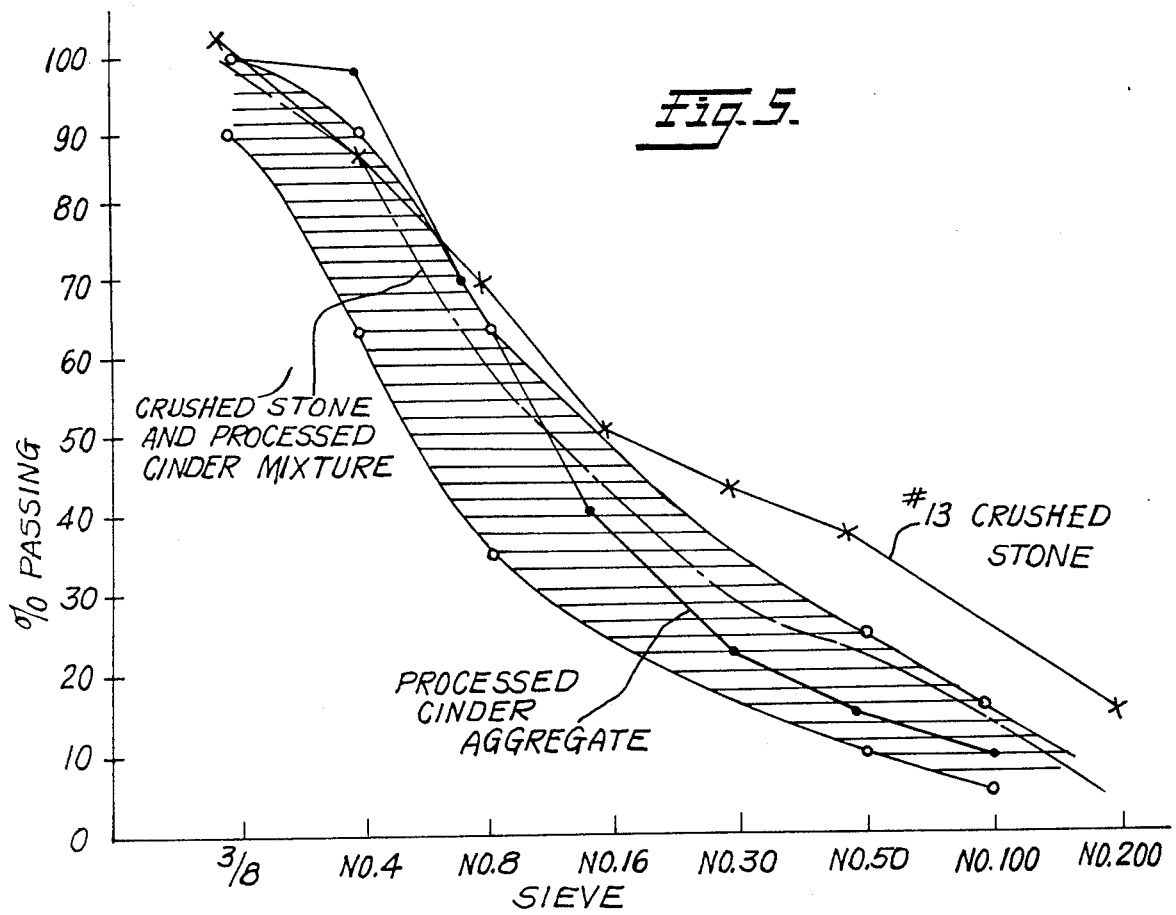
FIG. 5 is a graph showing a known, standard range of aggregate particle size proportions for maximum concrete strength and showing the relationship of certain aggregate materials with respect thereto.
Figure 4:
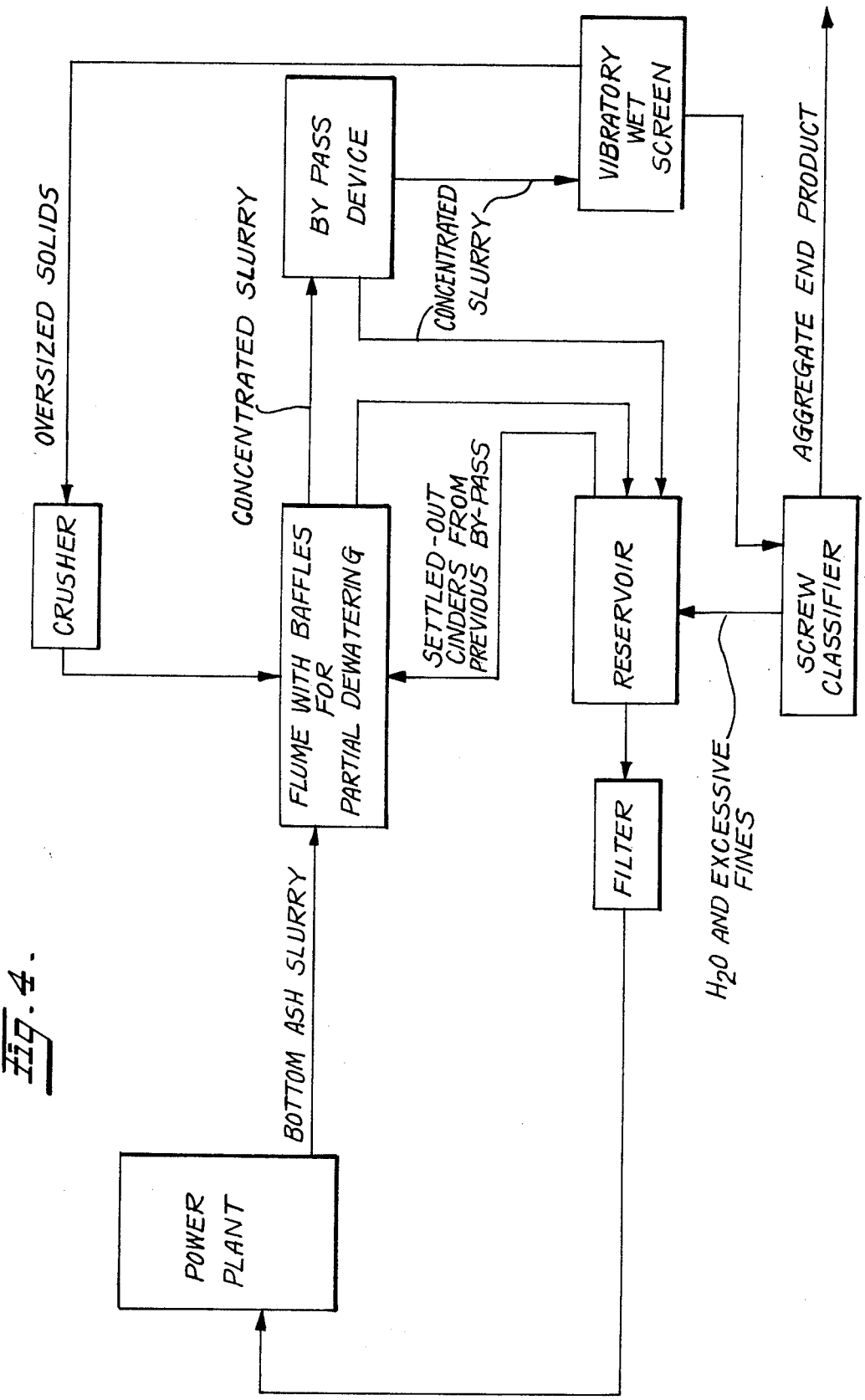
FIG. 4 is a flow chart illustrating the process for producing a cinder aggregate according to the present invention.

The graph of FIG. 5 shows how a mixture of the processed cinder of the present invention and conventional aggregate material provides a particularly high quality aggregate. The abscissa of the graph of FIG. 5 shows sieve sizes and the ordinate shows the percentage of material passing the various sieves. The shaded band represents the ASTM maximum strength law for concrete. In other words, when the proportions of particle sizes of the concrete aggregate fall within the shaded band, the strength of the concrete produced wil approach the maximum. As shown by the legends in the graph, No. 13 crushed limestone alone, while generally acknowledged to be a quality aggregate, falls outside the recommended band due to excessive fines. The processed cinder aggregate of the present invention compliments the curve of the crushed limestone sizes with lower proportions of fines and higher proportions of larger particles. The resulting mixture of No. 13 crushed limestone and processed cinder aggregate of the present invention falls within the maximum strength band over virtually its entire range as shown in FIG. 5.

As discussed, an aggregate comprising cinders processed in accordance with the present invention and No. 13 crushed limestone have been used in the production of building blocks. For comparison building blocks were also produced: (a) by using bottom ash cinders directly from the same power plant without processing in accordance with the present invention; and (b) by processing the same bottom ash through a vibrating screen in accordance with known methods. It was found that the masonry units made from aggregate produced in accordance with the present invention has the following properties in comparison with those produced by the above-mentioned other methods: (a) lower cement content per unit resulting in cost savings; (b) reduction of waste or cull units by 7-8%; (c) uniformity in color and texture of the finished units; (d) lower unit weight of the finished masonry unit; and, (e) reduction of time for steam curing of the green block, due apparently to the units giving up water faster as a result of using only desirable particles in the masonry unit and reduction of fine particles. The aggregate material produced in accordance with this invention has also been used to advantage in paving materials.

Tests have shown that where the proportion of fine particles which will pass 200 mesh has been reduced to between 1% and 6% by weight of the finished aggregate, the improved results described above are achieved. The process described above effects such reduction in the proportion of fine particles, and preferably, effects a reduction in the proportion of fine particles to between 2% and 5% be weight of the finished aggregate. Ideally the proportion of fine particles which will pass 200 mesh is 5%.

What is sought and achieved by the present invention is a finished aggregate with a smooth transition between proportions of particle sizes, and, in particular, a curve in the proportion by weight of particle sizes where the proportions of fine particles are low and change smoothly and steadily.

It should be understood that various modifications within the scope of this invention can be made by one of ordinary skill in the art without departing from the spirit thereof.

As indicated above, use of the expression "No. 13 crushed limestone" herein relates to standard No. 13 of the virginia State Highway Commission. This standard No. 13 is as follows:

| VIRGINIA DEPARTMENT OF HIGHWAY & TRANSPORTATION SPECIFICATION No. 13 Aggregates-Open Graded | | | |
|---|---|---|---|
| Amounts Finer Than Each Laboratory Sieve (Square Openings), Percentage by Weight | | | |
| Sieve Size | ½ | No. 4 | No. 100 |
| % Passing | Min. 100 | 92 ± 8 | 20 ± 10 |

Sieve sizes are in inches, and numbered sieves are those of the U.S. Standard Sieve Series.

What is claimed is:

1. A process for producing a cinder aggregate from solid particles of bottom ash formed by burning coal in a power plant, the process comprising the steps of:
   (a) mixing water with the bottom ash at the power plant to form a slurry;
   (b) transporting the slurry from the power plant through a conduit to a processing plant;
   (c) passing the slurry through a baffled flume in the processing plant to partially dewater the slurry; said step of passing the slurry through the flume including the steps of
      (i) directing solid particles in the slurry toward the bottom of the flume by baffles which are inclined downwardly in the direction of flow to produce a concentrated slurry component in the region of the bottom of the flume and an upper slurry component in the region of the top of the flume, said upper slurry component comprising excess water and undesirable proportions of fine particles; and
      (ii) directing the uppr, slurry component away from the slurry flow path as a first waste component;
   (d) passing the slurry through a classifier subsequent to said step of passing the slurry through the flume to claim the larger particles, said step of passing the slurry through the classifier including the steps of
      (i) classifying the material into a second waste component including water and undersized particles and into an aggregate component comprising solid particles of desired size; and
      (ii) directing the second waste component away from the flow path, and directing the aggregate component to a stockpile for use as an aggregate.

2. A process as defined in claim 1 wherein said passing steps include separating from said slurry a solid particle component in which from between 1% to 6% of the removed particles are of a size which will pass a 200 mesh sieve.

3. A process as defined in claim 1 wherein said passing steps include separating from said slurry a solid particle component in which from between 2% to 5% of the removed particles are of a size which will pass a 200 mesh sieve.

4. A process as defined in claim 1 including the further step of directing the slurry through a screen to remove oversized particles.

5. A process as defined in claim 4 wherein said step of passing the slurry through the screen includes removing all oversized particles incapable of passing through a screen having ⅜ inch openings.

6. A process as defined in claim 4:
   wherein said step of directing the slurry through the screen comprises directing the slurry through an inclined screen, the incline of the screen effecting movement of the screened-out oversized particles to the lower side of the screen; and
   including the step of conveying the screened-out oversized particles from the lower side of the screen to a repository.

7. A process as defined in claim 6 including the step of crushing the oversized particles conveyed to the repository by said conveying step and reintroducing the crushed particles into the slurry flow path at a point before which the slurry undergoes said step of directing through the screen.

8. A process for producing a cinder aggregate from solid particles of ash, the process comprising the steps of: passing an aqueous slurry containing ash through a baffled flume to partially dewater the slurry by directing solid particles in the slurry toward the bottom of the flume by baffles to produce a concentrated slurry in the region of the bottom of the flume and an upper slurry component in the region of the top of the flume and directing the upper slurry component away from the slurry flow path; passing the concentrated slurry component from the flume through an inclined screen to remove oversized particles; conveying the oversized particles away from the screen; and classifying the material which has passed through the screen into, on the one hand, a waste component including water and undersized particles and, on the other hand, an aggregate component including solid particles in certain desirable particle size proportions.

9. A process as defined in claim 2 wherein said passing steps include separating from said slurry a solid particle component in which less than 3% of the removed particles are of a size which will pass a 200 mesh sieve.

* * * * *